Oct. 9, 1934.  E. ROUX  1,976,636

MAGNETIC BALANCE FOR THE MEASUREMENT OF INTENSITIES

Filed Oct. 10, 1929  4 Sheets-Sheet 1

Inventor:
Erwin Roux
by [signature]
attorney

Oct. 9, 1934.  E. ROUX  1,976,636
MAGNETIC BALANCE FOR THE MEASUREMENT OF INTENSITIES
Filed Oct. 10, 1929  4 Sheets-Sheet 2
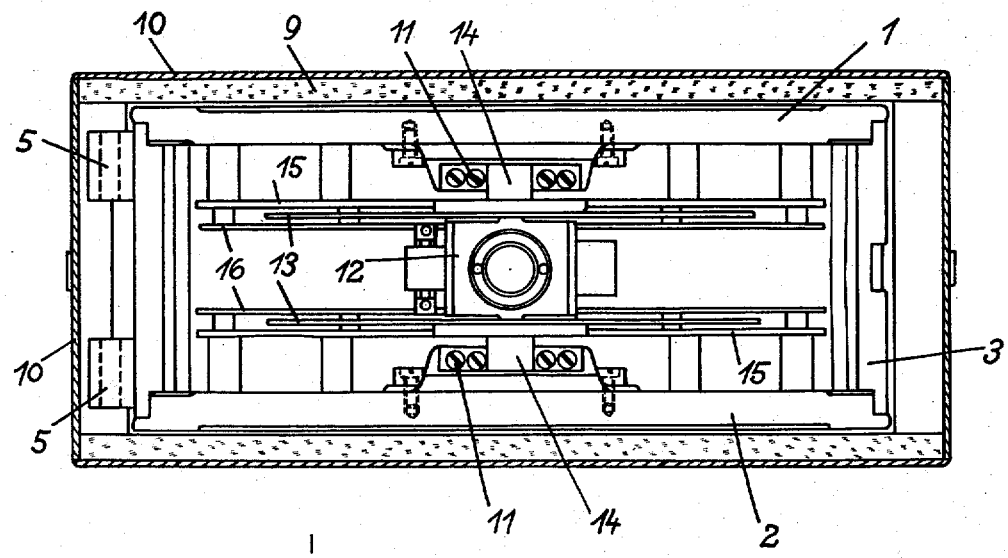
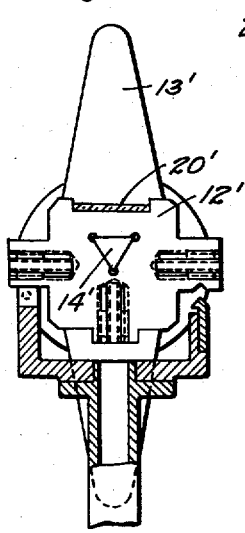
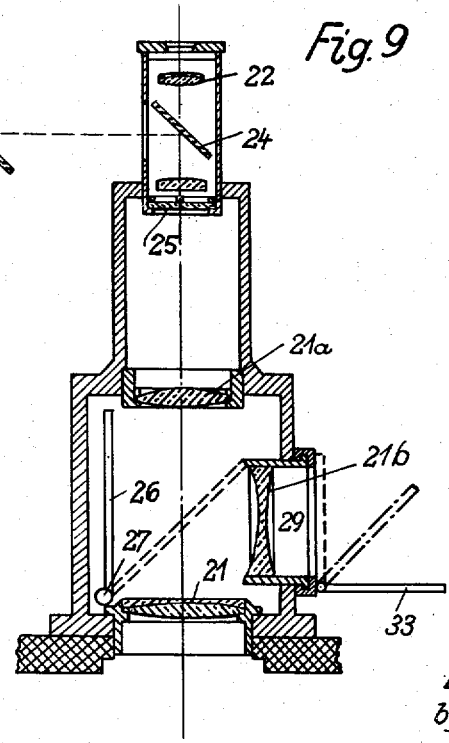

Oct. 9, 1934.  E. ROUX  1,976,636
MAGNETIC BALANCE FOR THE MEASUREMENT OF INTENSITIES
Filed Oct. 10, 1929  4 Sheets-Sheet 4
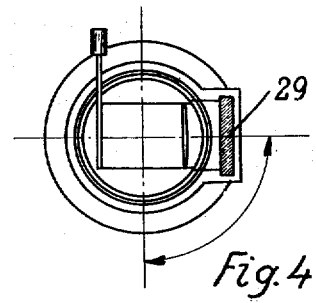
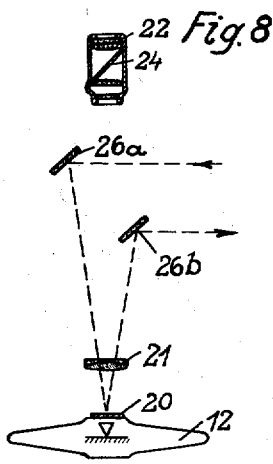
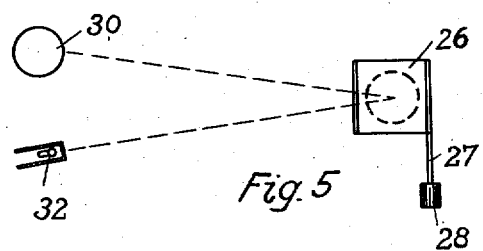
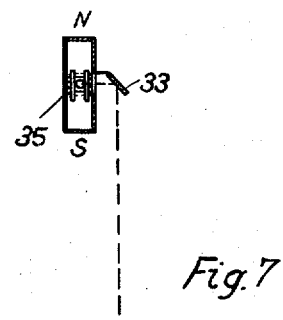
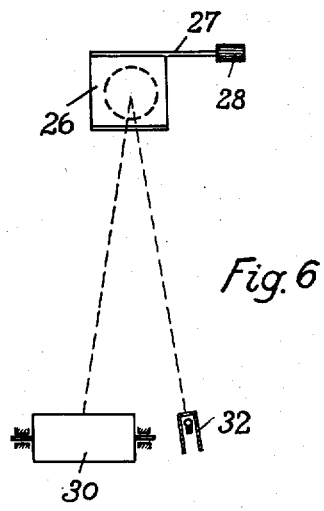
Inventor:
Erwin Roux
by [signature]
attorney Patented Oct. 9, 1934

1,976,636

UNITED STATES PATENT OFFICE 1,976,636

MAGNETIC BALANCE FOR THE MEASUREMENT OF INTENSITIES

Erwin Roux, Berlin-Friedenau, Germany, assignor to Askanid-Werke A. G. vormals Central Werkstatt Dessau und Carl Bamberg-Friedenau, a German company Application October 10, 1929, Serial No. 398,667
In Germany October 11, 1928

12 Claims.  (Cl. 33—222)

For geophysical investigations of the earth's crust, magnetic investigation methods have been recently used in which vertical, as well as horizontal, intensity measurements of the earth's field have been made. For this purpose, so-called magnetic balances are used in which the deflections of a magnetic balance system are observed or registered. The masses of the balance system are so distributed on the axis of suspension that the magnetic axis adjusts itself in the equilibrium position almost horizontally or almost vertically. Consequently for the measurement of the vertical and of the horizontal intensity of the earth field, separate magnetic balance systems are necessary, so that several instruments must be provided.

The present invention consists in providing an instrument in which the determinations of vertical and horizontal intensity are made possible by magnetic balance systems which are capable of arrangement in one casing. For this purpose the magnetic balance systems and especially the housing are so made that one balance system may be at will replaced by another. Each balance member or system consists of a pivoted body rigidly combined with bar magnets, whereby the balance member may be supported oscillatably about a horizontal axis which does not pass through the center of gravity, so that the magnet system under the influence of gravity and magnetic forces assumes a definite position of equilibrium wherein the magnetic axis is inclined at a very definite angle to the vertical. In this way, with the same instrument, alternate magnetic balance systems may be used having an approximately horizontal or an approximately vertical magnetic axis. The direction of the magnetic axis may be at any desired angle to the axis of the magnetic balance members, so as to measure the intensity in any desired direction. When, for the measurement of the deflections of the magnetic systems, besides or instead of, a visible reading, a registering apparatus is provided, in which the deflections are, for example, indicated on a paper strip sensitive to light arranged on a rotating drum, the light deflecting medium for the recording may, according to the invention, be so adjustably arranged that for the recording of the deflections of two similar instruments, of which one has a balance system with horizontally magnetized axis, and in the other there is a balance system with vertically magnetized axis, one and the same recording device may be used. By means of the adjustable arrangement of the light deflecting medium, it is furthermore made possible that the same instrument may be served by a recording device with horizontal or vertical or any other desired inclined axis of the drum carrying the sensitized paper, so that the recording device can be installed in any desired position with respect to the instrument.

In the accompanying drawings showing an example of means carrying out the objects of the invention:

Fig. 2 is a plan corresponding to Fig. 1 with the upper housing half removed, Fig. 4 is a section through Fig. 3 along the line 4—4.

Figs. 5 and 6 show diagrammatically the arrangement of the recording device with two different positions of the mirror deflecting the light rays, in plan, and Fig. 7 shows diagrammatically the arrangement with simultaneous recording of the deflection of two instruments by means of the same recording device.

Fig. 8 shows diagrammatically a different arrangement of the means for deflecting the light for the recording, Fig. 9 is a variation of the construction according to Fig. 1, and Fig. 10 is a fragmentary view showing in side elevation a separate balance device to be used interchangeably with the balance device shown in Figs. 1, 2 and 3.

Figure 1:
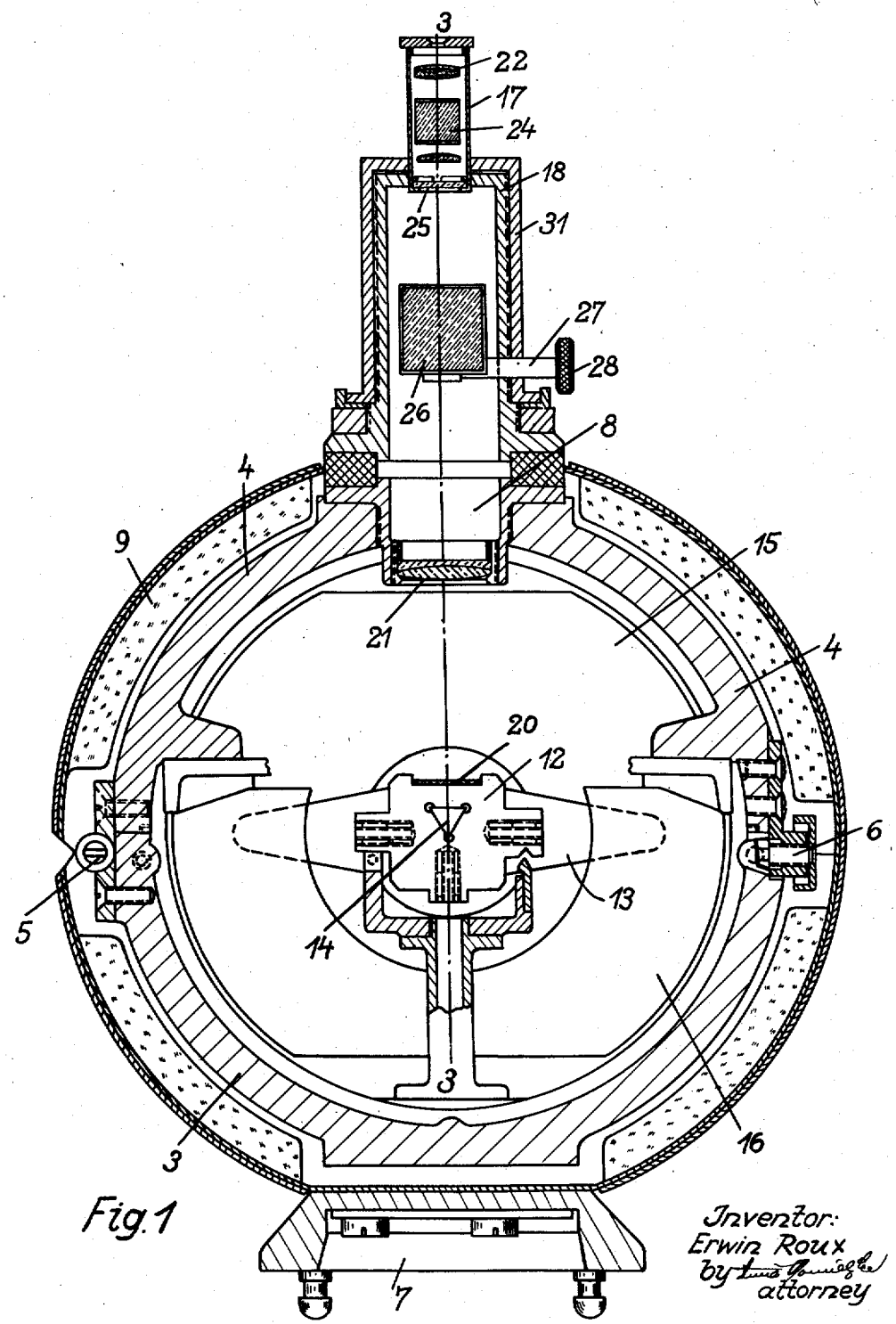
Fig. 1 is a cross section through the housing of a magnetic balance constructed according to the invention.

The housing of the magnetic balance is, according to the invention, constructed as a hollow cylinder consisting of the two side plates 1 and 2 and a cylindrical jacket which itself is composed of two parts 3 and 4. The two parts 3 and 4 are connected together on one side by hinges 5, and can be locked on the other side by a catch 6. Each of the two parts 3 and 4 forms a half cylinder. Consequently by releasing the lock 6 and folding back the top part 4 of the cylinder, the space between the two plates 1 and 2 is exposed. The lower part 3 of the cylindrical casing is provided in any desired manner with a foot 7, which serves to set up the instrument, while the part 4 carries an observation telescope which will be further described below. The whole casing can be surrounded in a known manner with an insulating jacket 9 of cork or the like, covered on the outside by metal plates 10. On the two faces 1 and 2 of the casing are provided, one on each, supports 11 for the balance system. The latter consists essentially of a balance body 12 of non-magnetic material, for example, of an aluminum alloy which is provided on its two sides with magnet blades 13. The knife edges 14 project from the sides of the magnet blades, and the balance body rests with these on the supports 11. On the upper side of the balance body 12 is arranged a mirror 20. In order to damp the movement, there are provided for each of the magnet blades two copper plates 15 and 16 which are fastened on the faces 1 and 2 of the housing, and of which the plates 15 nearest the faces reach over the whole height of the casing, while the other plates 16 only extend slightly above the centre.

In consequence of the cylindrical shape of the casing a balance system may be chosen as shown in full lines in Fig. 1 of the drawings to be used for measurement of the vertical intensity, or a balance system having the magnet blades fitted on the balance body in the position shown in Fig. 10, may be used to measure the horizontal intensity. In Fig. 10 primed numerals designate parts of the balance device corresponding with similar parts in Fig. 1. Thus, it is only necessary when it is desired to make the two measurements alternately, after opening the casing, that is, after folding back the upper half cylinder 4, to take out the balance system actually in use with the parts fixed thereto, and to replace it with the other, while of course the magnetic axis may also lie in any other desired direction. The shape of the damping discs 15, 16 is such that they can serve for the damping of each magnet system irrespectively of the direction in which the magnetic axis lies.

The observation telescope fitted above the mirror 20 consists of an objective 21 inserted in an opening of the casing part 4 and of an eye piece 22 which is fitted in a tube 17 which is carried on the upper end of a sleeve 18 arranged on the casing part 4. By means of a mirror 23 (Fig. 3) adjustable as desired, daylight or light from an artificial source is thrown against a parallel plane glass plate 24 arranged in the tube 17 at an angle of 45°, and from there through a glass scale 25 to the mirror 20. In the eye piece 22, therefore, both the fixed scale 25 and the movable image of this scale in the mirror 20 of the balance body 12, are seen, so that the deflection of the balance beam can be directly read off. Inside the sleeve 18 a mirror 26 is provided which is rotatable about an axis 27 and can be adjusted in two positions by means of a handle 28, viz:— either in the position shown by full lines in Fig. 3, in which it is vertical, that is, parallel to the optical axis of the telescope, or in the position shown in dotted lines in which it is inclined at an angle of 45° to the optical axis. In the last-mentioned case, the rays reflected from the mirror 20 of the balance body 12 are deflected 90° by means of the mirror 26 and thrown through the side aperture 29. In front of the aperture, a recording device of any desired known construction is provided which in the diagrammatic arrangement shown by Figs. 5 and 6 is provided with the reference numeral 30 and consists, for example, of a drum covered with sensitized paper.

The axis 27 of the mirror 26 passes through a slit 19 made in the sleeve 18 and is carried in a part 31 surrounding the sleeve 18. This part 31 is, according to the invention, rotatable about the optical axis of the telescope, and can be preferably adjusted in the two positions displaced by an angle of 90° with respect to each other, shown in Figs. 5 and 6. By this rotation the mirror axis 27, as Figs. 5 and 6 show, comes into a position in which it is parallel to the oscillation axis of the balance body, and in the other position in which it is perpendicular to the oscillation axis of the balance body. In one case, therefore, the recording device 30 can contain a drum with a vertical axis and in the other case a drum with horizontal axis, as is also shown in Figs. 5 and 6 in which the illuminating device is indicated by 32. For the adjustment of the mirror axis 27, intermediate between the two positions mentioned a recording device can be used with an axis inclined as desired. The setting up of the recording device can therefore take place according to the local conditions in any desired azimuth with respect to the magnetic balance, it is not therefore confined to the magnetic meridian or to a definite direction in respect of the magnetic meridian.

Figure 3:
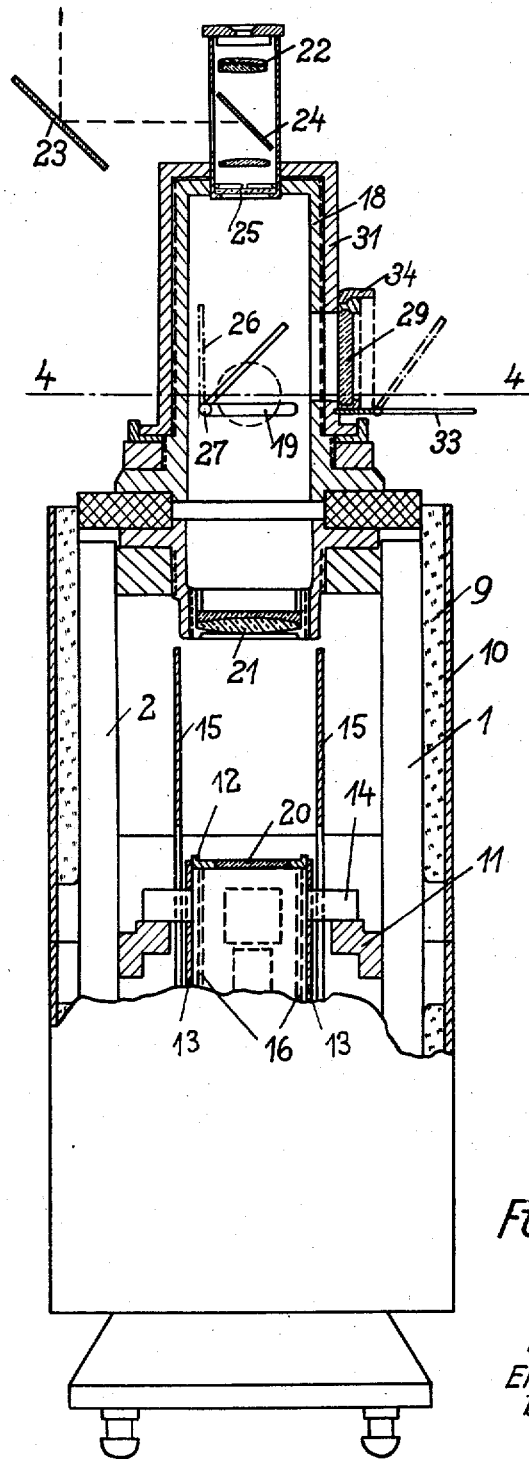
Fig. 3 is partly a side view and partly a section through Fig. 1 along the line 3—3.

The aperture 29 should be closed when the recording device is not in use and for this purpose a closing flap 33 is provided which can be adjusted in three different positions, viz:—either in the fully closed position as shown in broken lines in Fig. 3, or in the half opened position which is shown by dot and dash lines, or finally in the fully opened position which is shown by full lines. In the last named position the ray of light reflected from the mirror 26 can pass freely out and reach the recording device. In the first position, the aperture is closed for visual reading.

The central position shown by dot and dash lines, in which the flap 33 is inclined at an angle of 45° to the horizontal, serves, according to the invention, to permit the deflections of two similar instruments of which one carries a balance system with horizontal magnetic axis, and the other a balance system with vertical magnetic axis, to be transmitted on the one and the same recording device. For this purpose, the flap 33 is connected by means of a hinge on to a ring-shaped holder 34 which is rotatably arranged about the optical axis of the telescope. When, as shown in Fig. 7, the two instruments are so used that one 35 serves for the measurement of the variations of the horizontal intensity, and the second 36 for the measurement of the variations of the vertical intensity, then by rotating the holder ring 34 the closing flap 33 with the instrument 35 can be brought into the position shown in Fig. 7. The flap is made inside as a mirror and the light rays passing through the aperture are then deflected by the flap through 90°. Thus, in the manner shown in Fig. 7, the recording rays of light thrown out by both instruments pass through two prisms 37, 38 into the recording apparatus, so that the deflections of the two instruments are shown side by side on the paper strip.

In the arrangement shown in Fig. 8, instead of one mirror 26, two mirrors 26a and 26b are provided for the photographic recording, and these are fitted at the side of the ray path of the visible reading in such manner that they deflect the light rays passing in and out through side apertures.

In the form of construction shown, it is necessary that in the visual observation, the actual image projected through the lens 21 is produced in the focal plane of the eye piece. The focal distance of the lens 21 must therefore be comparatively short. If the balance, on the other hand, is used for recording, then the actual image projected by the lens 21 must be produced on the sensitive strip of the recording apparatus. The latter must therefore be brought very close to the aperture 29 and this, even when it is possible, leads to inconveniences. Consequently in order to obtain useful measurements, an objective 21 with a short focal distance, must be used for visual observation, and one with a long focal distance for recording.

The inconveniences caused by the changing of the objective 21 are avoided, according to the altered form of construction shown in Fig. 9, by a convex lens 21a being inserted in front of the eye piece for the purpose of visual observation, this effecting a corresponding shortening of the focal distance of the lens 21. On the contrary, a concave lens 21b is inserted in the aperture 29 which by suitable arrangement of the curvature acts in such a way that the focal distance of the lens 21 is lengthened to a sufficient extent. In other respects, Fig. 9 corresponds to the upper part of Fig. 3. The same reference signs are employed in so far as the two figures agree. Fig. 9 is an alteration in the form of construction according to Fig. 3.

The invention is, of course, as far as the construction is concerned, not confined to the example shown. For example, instead of the cylindrical shape of the casing, a prismatic shape might be used in so far as the casing is so constructed that it can be used for the various kinds of magnet systems. In the same way, any other means may be used for the opening and closing of the casing. Thus, for example, instead of the hinge, a bolt or the like may be provided on each side. For the adjustment of the light deflecting medium, for example, of the mirror 26 and of the flap 33 other positions of course may be chosen than those described, if it is not desired to deflect the rays through 90° but to choose a different arrangement of the recording device.

I claim:—

1. A magnetic balance comprising a casing, a balance body pivoted therein and provided with a mirror, and a telescope for observing the oscillations and the position of equilibrium of said balance body, said telescope comprising a tube, said tube being set into the casing with its optical axis vertical and directed upon the mirror of the balance body, the tube containing transparent material having a scale thereon, arranged in the focal plane of the telescope objective, an eyepiece consisting of two collecting lenses, a plane-parallel glass plate arranged between the collecting lenses and inclined at an angle of 45° to the optical axis, there being an opening in the mounting of the eyepiece, laterally of the plane-parallel glass plate, and a lateral opening between the objective and the glass scale in the wall of the tube, a shaft rotatably supported in the tube opposite the opening, a mirror secured to the shaft within the tube, and means for turning the shaft into two positions, in one of which the mirror clears the path of light from the objective to the eyepiece and in the other of which the objective deflects rays passing therethrough through an angle of 90° and through the lateral opening.

2. A magnetic balance as specified in claim 1 including further a hinged cover for the lateral opening of the tube, suitable for closing the opening, and clearing the path for the light deflected by the mirror upon the rotatable shaft.

3. A magnetic balance as specified in claim 1 including further a hinged cover for the lateral opening of the tube, suitable for closing the opening and clearing the path for the light deflected by the mirror upon the rotatable shaft, and said hinged cover having a reflecting surface on its inner face.

4. A magnetic balance as specified in claim 1 including further a ring rotatably mounted concentrically with the lateral opening, and a cover, having a reflecting inner surface, hinged to said ring and arranged to close said opening when desired.

5. A magnetic balance as specified in claim 1 wherein there is inserted in the telescope tube back of the objective and in front of its focal point, a collecting optical system which together with the objective constitutes an objective of shorter focal length for the eyepiece, in the common focal plane of which the transparent glass scale is arranged, while the shaft with the mirror is arranged between the objective and the collecting optical system and likewise the lateral opening in the tube.

6. A magnetic balance as specified in claim 1 wherein a divergent optical system is arranged in the said lateral opening, which in cooperation with the telescope objective constitutes a combined objective of greater focal length.

7. A magnetic balance comprising a casing with a magnetic balance body pivoted therein and carrying a mirror, a telescope arranged to cooperate with said casing and comprising a tube with a vertical optical axis directed downwardly upon the mirror of the balance, a lateral opening being provided in the tube, two stationary approximately parallel small mirrors opposite the opening in the tube, inclined at a small angle with respect to the axis of the tube, the mirrors being arranged on opposite sides of the optical axis and at such a distance from the latter and of such sizes that between the mirrors the straight light path through the objective to the eyepiece remains free, the mirrors being displaced with respect to one another in height in such way that a bundle of rays coming from the outside striking the one mirror is reflected through the objective upon the mirror of the pivoted magnetic balance body, from the latter through the objective back to the other mirror and from this is reflected outward through the opening.

8. A magnetic balance as specified in claim 7 wherein there is further provided a shaft carrying a mirror which may be swung into and out of the path of light in the tube, and an element rotatable about the axis of the tube for supporting said shaft.

9. A magnetic balance as specified in claim 7 wherein the mirrors arranged on opposite sides of the optical axis are supported by a member rotatable about the axis of the telescope tube.

10. A magnetic measuring instrument of the character described comprising, in combination, a casing; spaced bearing members rigidly mounted in the casing; a magnetic balance device removably and pivotally mounted on said bearing members with its axis extending in a substantially horizontal direction to determine magnetic intensity, said bearing members and casing being adapted to support and accommodate a similar magnetic balance device with its axis extending in a substantially vertical direction; and means associated with said casing to determine the respective deflections of a balance device when in position on said bearing members.

11. A magnetic measuring instrument of the character described comprising, in combination, a substantially cylindrical casing with its axis horizontal and having a cover portion adapted to be opened and closed to permit access to the interior thereof; spaced bearing members mounted in the casing; a magnetic balance device, including a body having bar magnets, removably and pivotally mounted on said bearing members with its magnetic axis extending in one direction to determine magnetic intensity, said bearing members and casing being adapted to support and accommodate a similar magnetic balance device with its axis at right angles to the first axis; and means to determine the deflections of a balance device when in position on said bearing members.

12. In combination with a magnetic measuring instrument of the character described having a substantially cylindrical casing with its axis horizontal and provided with bearing supports, a magnetic balance device having means whereby it may be removably mounted on said bearing supports with its magnetic axis horizontal, said bearing members being adapted to support and accommodate another balance device with its magnetic axis vertical whereby both vertical and horizontal components of the magnetic forces at any given point may be determined; and means to determine deflections of a balance device when in position on said bearing members.

ERWIN ROUX.

CERTIFICATE OF CORRECTION.

Patent No. 1,976,636.                                            October 9, 1934.

ERWIN ROUX.

It is hereby certified that the name of the assignee in the above numbered patent was erroneously written and printed as "Askanid-Werke A. G. Vormals Central Werkstatt Dessau und Carl Bamberg-Friedenau" whereas said name should have been written and printed as Askania-Werke A. G. Vormals Central Werkstatt Dessau und Carl Bamberg-Friedenau, as shown by the records of the case in this office; and that the said Letters Patent should be read with this correction therein that the same may conform to the record of the case in the Patent Office.

Signed and sealed this 13th day of November, A. D. 1934.

Leslie Frazer (Seal)                                        Acting Commissioner of Patents.

to be opened and closed to permit access to the interior thereof; spaced bearing members mounted in the casing; a magnetic balance device, including a body having bar magnets, removably and pivotally mounted on said bearing members with its magnetic axis extending in one direction to determine magnetic intensity, said bearing members and casing being adapted to support and accommodate a similar magnetic balance device with its axis at right angles to the first axis; and means to determine the deflections of a balance device when in position on said bearing members.

12. In combination with a magnetic measuring instrument of the character described having a substantially cylindrical casing with its axis horizontal and provided with bearing supports, a magnetic balance device having means whereby it may be removably mounted on said bearing supports with its magnetic axis horizontal, said bearing members being adapted to support and accommodate another balance device with its magnetic axis vertical whereby both vertical and horizontal components of the magnetic forces at any given point may be determined; and means to determine deflections of a balance device when in position on said bearing members.

ERWIN ROUX.

CERTIFICATE OF CORRECTION.

Patent No. 1,976,636.          October 9, 1934.

ERWIN ROUX.

It is hereby certified that the name of the assignee in the above numbered patent was erroneously written and printed as "Askanid-Werke A. G. Vormals Central Werkstatt Dessau und Carl Bamberg-Friedenau" whereas said name should have been written and printed as Askania-Werke A. G. Vormals Central Werkstatt Dessau und Carl Bamberg-Friedenau, as shown by the records of the case in this office; and that the said Letters Patent should be read with this correction therein that the same may conform to the record of the case in the Patent Office.

Signed and sealed this 13th day of November, A. D. 1934.

Leslie Frazer (Seal)          Acting Commissioner of Patents.